(12) United States Patent
Ball et al.

(10) Patent No.: US 8,004,674 B2
(45) Date of Patent: Aug. 23, 2011

(54) DATA COLLECTION SYSTEM AND METHOD FOR A FLOW CYTOMETER

(75) Inventors: Jack T. Ball, Ann Arbor, MI (US); Collin A. Rich, Ypsilanti, MI (US); Clare E. Rogers, Plymouth, MI (US)

(73) Assignee: Accuri Cytometers, Inc., Ann Arbor, MI (US)

( * ) Notice: Subject to any disclaimer, the term of this patent is extended or adjusted under 35 U.S.C. 154(b) by 80 days.

(21) Appl. No.: 12/476,877

(22) Filed: Jun. 2, 2009

(65) Prior Publication Data

US 2010/0302536 A1   Dec. 2, 2010

(51) Int. Cl.
*G01J 3/30* (2006.01)
(52) U.S. Cl. ....................................................... 356/317
(58) Field of Classification Search ................... 356/317
See application file for complete search history.

(56) References Cited

U.S. PATENT DOCUMENTS

| | | | |
|---|---|---|---|
| 4,691,829 A | 9/1987 | Auer | |
| 4,755,021 A | 7/1988 | Dyott | |
| 5,150,313 A | 9/1992 | van den Engh et al. | |
| 5,204,884 A | 4/1993 | Leary et al. | |
| 5,224,058 A | 6/1993 | Mickaels et al. | |
| 5,230,026 A | 7/1993 | Ohta | |
| 5,270,548 A | 12/1993 | Steinkamp | |
| 5,308,990 A | 5/1994 | Takahashi et al. | |
| 5,367,474 A | 11/1994 | Auer et al. | |
| 5,469,375 A | 11/1995 | Kosaka | |
| 5,684,480 A | 11/1997 | Jansson | |
| 5,883,378 A | 3/1999 | Irish et al. | |
| 5,981,180 A | 11/1999 | Chandler et al. | |
| 6,108,463 A | 8/2000 | Herron et al. | |
| 6,115,065 A | 9/2000 | Yaddi-Pecht et al. | |
| 6,139,800 A | 10/2000 | Chandler | |
| 6,181,319 B1 | 1/2001 | Fujita et al. | |
| 6,710,871 B1 | 3/2004 | Goix | |
| 6,778,910 B1 | 8/2004 | Vidal et al. | |
| 6,809,804 B1 | 10/2004 | Yount et al. | |
| 6,816,257 B2 | 11/2004 | Goix | |
| 6,890,487 B1 | 5/2005 | Sklar et al. | |
| 6,897,954 B2 | 5/2005 | Bishop et al. | |

(Continued)

FOREIGN PATENT DOCUMENTS

JP          56169978 A       6/1980

(Continued)

OTHER PUBLICATIONS

U.S. Appl. No. 12/792,536, filed Jun. 2, 2010, Ball et al.

*Primary Examiner* — Tarifur R Chowdhury
*Assistant Examiner* — Abdullahi Nur
(74) *Attorney, Agent, or Firm* — Jeffrey Schox

(57) ABSTRACT

A system for a flow cytometer that collects data for a sample prepared with a plurality of fluorochromes that includes a fixed gain detection system that collects data for a plurality of fluorescence channels, fluorochrome compensation factors for a plurality of fluorochromes types, and a computer system that has an interface that gathers fluorochrome information of the sample and an analysis program that compensates for spectral spillover in the collected data. The fixed gain detection system preferably has a wide dynamic range. A fluorochrome compensation factor preferably remains constant for a fixed gain detection system. The analysis program preferably uses the fluorochrome compensation factors to compensate for spectral spillover.

25 Claims, 4 Drawing Sheets

U.S. PATENT DOCUMENTS

| | | |
|---|---|---|
| 7,019,834 B2 | 3/2006 | Sebok et al. |
| 7,024,316 B1 | 4/2006 | Ellison et al. |
| 7,106,442 B2 | 9/2006 | Silcott et al. |
| 7,130,046 B2 | 10/2006 | Fritz et al. |
| 7,274,316 B2 | 9/2007 | Moore |
| 7,362,432 B2 | 4/2008 | Roth |
| 7,739,060 B2 | 6/2010 | Goebel |
| 2002/0028434 A1 | 3/2002 | Goix et al. |
| 2002/0049782 A1 | 4/2002 | Herzenberg |
| 2002/0059959 A1 | 5/2002 | Qatu et al. |
| 2002/0080341 A1 | 6/2002 | Kosaka |
| 2002/0123154 A1 | 9/2002 | Burshteyn |
| 2003/0035168 A1 | 2/2003 | Qian et al. |
| 2003/0054558 A1 | 3/2003 | Kurabayashi |
| 2003/0078703 A1 | 4/2003 | Potts et al. |
| 2003/0175157 A1 | 9/2003 | Micklash, II et al. |
| 2003/0223061 A1 | 12/2003 | Sebok |
| 2003/0235919 A1 * | 12/2003 | Chandler ............... 436/43 |
| 2004/0031521 A1 | 2/2004 | Vrane et al. |
| 2004/0131322 A1 | 7/2004 | Ye et al. |
| 2004/0143423 A1 | 7/2004 | Parks et al. |
| 2004/0246476 A1 | 12/2004 | Bevis et al. |
| 2005/0044110 A1 | 2/2005 | Herzenberg |
| 2005/0069454 A1 | 3/2005 | Bell |
| 2005/0073686 A1 | 4/2005 | Roth et al. |
| 2006/0015291 A1 | 1/2006 | Parks et al. |
| 2006/0161057 A1 | 7/2006 | Weber |
| 2006/0219873 A1 | 10/2006 | Martin et al. |
| 2006/0286549 A1 | 12/2006 | Sohn et al. |
| 2007/0003434 A1 | 1/2007 | Padmanabhan et al. |
| 2007/0124089 A1 | 5/2007 | Jochum et al. |
| 2007/0212262 A1 | 9/2007 | Rich |
| 2007/0224684 A1 | 9/2007 | Olson et al. |
| 2008/0055595 A1 | 3/2008 | Olson et al. |
| 2008/0152542 A1 | 6/2008 | Ball |
| 2008/0228444 A1 | 9/2008 | Olson et al. |
| 2009/0104075 A1 | 4/2009 | Rich |
| 2010/0012853 A1 | 1/2010 | Parks |
| 2010/0032584 A1 | 2/2010 | Dayong et al. |
| 2010/0118298 A1 | 5/2010 | Bair et al. |

FOREIGN PATENT DOCUMENTS

| | | |
|---|---|---|
| WO | 2005017499 | 2/2005 |
| WO | 2005068971 | 7/2005 |
| WO | 2005091893 | 10/2005 |
| WO | 2007/103969 | 3/2007 |
| WO | 2008/058217 | 5/2008 |
| WO | 2010/101623 | 9/2010 |

* cited by examiner

DATA COLLECTION SYSTEM AND METHOD FOR A FLOW CYTOMETER

CROSS-REFERENCE TO RELATED APPLICATIONS

This application is related to U.S. patent application Ser. No. 11/400,890 filed on 31 Mar. 2006 and Ser. No. 11/446,391 filed on 22 Aug. 2006, which are both incorporated in their entirety by this reference and, together with the subject patent application, are all owned by the same company.

TECHNICAL FIELD

The present invention relates generally to the field of flow cytometers, and more particularly to the field of detection systems for flow cytometers.

BACKGROUND

A typical flow cytometer includes an exciter, an interrogation zone, and a detector. The detector functions to collect signals from objects, ranging from small to large, in the interrogation zone. The typical detector has a limited collection range, and is typically provided with a gain level. To collect signals from small objects, the gain level is increased. With an increased gain level, however, the signals from large objects are too bright to be collected. Accordingly, to collect signals from large objects, the gain level is decreased. With a decreased gain level, however, the signals from small objects are too faint to be collected. Thus a fundamental problem with flow cytometry is the selection of gain levels for the amplifiers operating on the detector signal.

In quantitative terms, the collection range for a typical flow cytometer with a photomultiplier tube is three to four decades, where a decade is defined as a logarithmic measurement interval consisting of a multiplication or division by a power of ten. In flow cytometry, the signal range of the objects may span five or more decades across experiments, i.e. a range of 1-100,000 units or more between data points. As such, the collection range of a typical flow cytometer is smaller than the signal range of the objects. For this reason, users are typically required to pre-set the gain levels of the detector by setting one or more voltages for the photomultiplier tubes and/or amplifier gains such that they correspond to an anticipated range of data points for the objects.

The requirement of this set-up step, which must occur before the collection of any data, has several disadvantages. One disadvantage, the user must expend valuable time and energy in anticipating the appropriate range for collection and data processing. A second disadvantage, any pre-selection of the detector gain necessarily includes the potential loss of valuable data because the user incorrectly anticipated the actual signal range and a portion or more of the input signals are outside the user-set collection range and are not collected.

Another disadvantage is the difficulty related to the concept of spectral spillover. Most fluorochromes used in flow cytometer analyses have broad emission spectra and therefore produce detectable signals in multiple channels. Typically, a fluorochrome will have the majority of its signal detected by only one detector, which is defined (by use of an appropriate light filter) as the primary detector. Fluorescence detected by detectors, other than that defined as the primary, is termed "spillover". (Spillover is actual fluorescence, not an artifact, as the term would imply.) Spectral compensation refers to a mathematical algorithm that allows the operator to subtract spillover fluorescence signals from any channel. Applying spectral compensation to a data set changes the fluorescence channel number assigned to events in the "spillover" (non-primary) detector by subtracting a predetermined percentage of the original channel number. The amount of spillover for any given fluorochrome into neighboring channels is dependent on a number of factors, including (but not limited to) the fluorochrome, the laser excitation wavelength and power, the optic configuration for light collection, the light filters used, the sensitivity of the detectors, and the amount of amplification (voltage and/or gain) applied to the detectors. Thus, the flow cytometer setup procedure is a great disadvantage since variables associated with the detector factor into the compensation of spectral spillover.

Accordingly, there is a need in the art to create a new and improved detection system for a flow cytometer that avoids or minimizes these disadvantages. The present invention provides such new and improved detection system for a flow cytometer.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
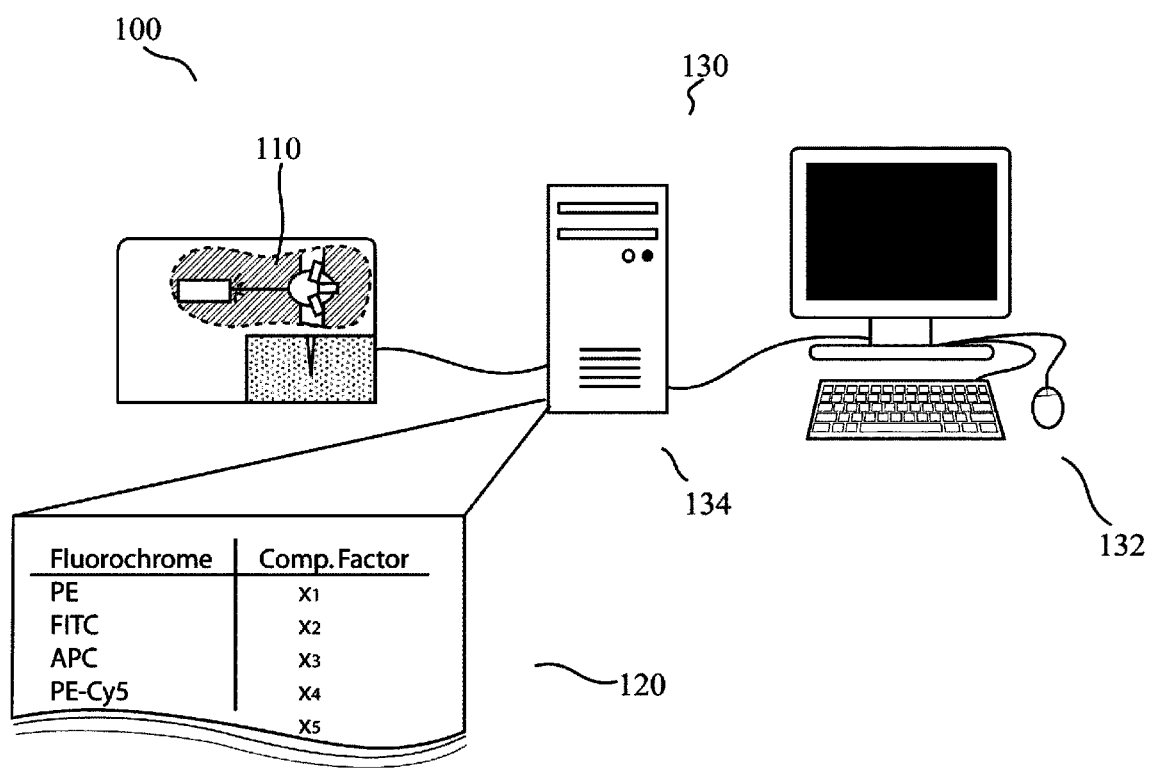
FIG. 1 is a schematic representation of a system of a preferred embodiment of the invention.

As shown in FIG. 1, a system for a flow cytometer 100 that collects data for a sample prepared with a plurality of fluorochromes includes a fixed gain detection system 110, fluorochrome compensation factors 120, a computer system 130 that includes an interface 132 for gathering fluorochrome information of the sample and a software program 134 that compensates for spectral spillover. The system 100 functions to reduce the variables associated with spectral spillover to only the fluorochrome information for a particular sample by using a fixed gain detection system. Calibration of the flow cytometer or the performing of a single fluorochrome sample is preferably not necessary with the preferred embodiment.

1. Fixed Gain Detection System

Figure 2:
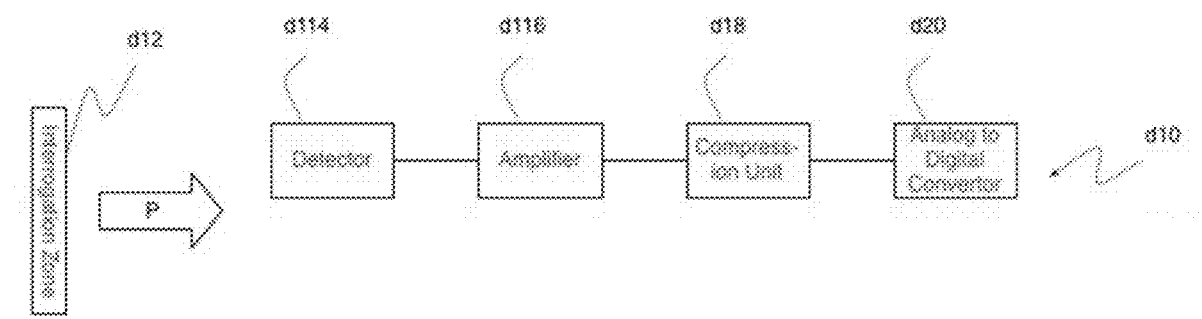
FIG. 2 is a block diagram of the detection system of the flow cytometer system of the preferred embodiment.
Figure 3:
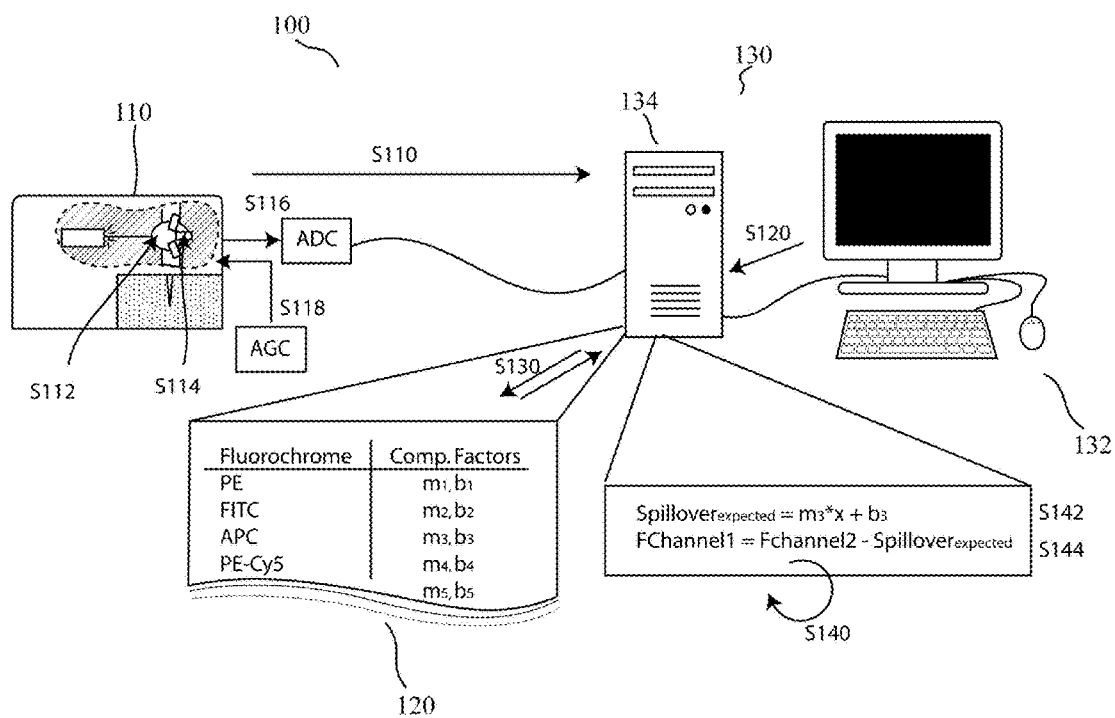
FIG. 3 is a schematic representation of a method of the preferred embodiment of the invention.

As shown in FIG. 2, the fixed gain detection system 110 of the preferred embodiment functions to allow simultaneous collection of both small/faint objects and large/bright objects by the flow cytometer. The fixed gain detection system 110 is preferably designed to be integrated into a flow cytometer having an interrogation zone d12. The detection system 110 preferably does not require calibration or adjustments to the settings of the detection system 110 (this includes human or computer/automatic calibration of the detection system for an experiment). In other words, adjustments and calibration of the gain settings of the detection system is preferably not required for experiments with varying samples. As such, the voltage and gain is preferably fixed. A typical single fluorochrome calibration sample run, that is typically used for calibrating a typical detection system of a flow cytometer, is preferably not necessary with the detection system 110 of the present invention. When used for interrogating a sample with a plurality of fluorochromes, the fixed gain detection system reduces the factors of spectral spillover so that the amount of spillover varies in a substantially linearly fashion with increasing fluorescence (exemplified in FIG. 5).

The detection system 110 preferably has a wide dynamic range that enables the fixed gain or fixed nature of the detection system. The wide dynamic range of the detection system 110 is preferably a six decade detection range or greater. Additionally, the wide dynamic range preferably enables the flow cytometer to detect particles of the sample that are disparate in size, preferably ranging from 1 micron up to 100 microns. However, the detection system 110 may alternatively allow for any suitable dynamic range such that the system remains substantially fixed. Once a fixed gain detection system 110 has been calibrated (such as during manufacturing and/or for custom fluorochromes, performed preferably once by a user), the output of the detection system 110 preferably represents an absolute photon count (or other suitable photometric units). A data output is preferably photons/second, watts, or any similar absolute units. This photometric capability functions to allow absolute measurements from other systems to be directly compared without compensating for different calibration settings and gains for individual systems as may be done for variable gain systems. Examples of possible applications include FRET (fluorescence resonance energy transfer) based cytometric assays, absolute MESF (molecules of equivalent soluble fluorophore) measurements or similar metrics for the emission levels of cytometry calibration beads across production lots. MESF data is preferably calculated by using the calibrated intensity of the excitation laser at the interrogation zone and the output of the fixed gain detection system 110. The detection system 110 may be used in the co-detection of mammalian cells and bacteria. The average diameter of mammalian cells is between 10 and 30 microns, while the average diameter of bacteria or yeast is between 1 and 4 microns. The relative diameters of these objects are disparate enough that they generally cannot be properly examined using a single gain setting on a typical flow cytometer. With such a detection system 110 in a flow cytometer, however, both mammalian cells and bacteria may be simultaneously present in the same sample. When used for interrogating a sample with a plurality of fluorochromes, the fixed gain detection system 110 reduces the variables of spectral spillover so that the amount of spillover has a predictable relationship with the type of fluorochromes. The fixed gain characteristic and wide dynamic range of the detection system 110 alleviates the need for individual adjustments to the detectors or settings of the detection system and removes the associated variables for the spectral spillover. In many cases, the amount of spillover is reduced to a linear relationship for spillover between multiple fluorescence channels.

The detection system 110 preferably includes a detector d14 and an analog-to-digital converter (ADC) d20. The detector d14 is adapted to receive photonic inputs P from the interrogation zone d12 and preferably produce an analog signal, and the analog-to-digital converter (ADC) d20 is preferably coupled to the detector d14 and adapted to convert an analog signal to a digital signal. The detector d14 has a dynamic range that is preferably greater than or equal to 100 dB. The ADC d20 has a bit resolution that is preferably greater than or equal to 16-bits, and more preferably greater than or equal to 24-bits, but any suitable bit resolution may alternatively be used. Any suitable design of a fixed gain detection system may alternatively be used.

The detector d14 of the preferred embodiment functions to receive photonic inputs from the interrogation zone and produce analog signals based on these photonic inputs. The detector d14 is preferably operable over a wide dynamic range. As used herein, the term "wide dynamic range" is preferably greater than or equal to 100 dB. The detector d14 preferably has a luminous sensitivity between 80 and 120 microamps per lumen, but may alternatively have a luminous sensitivity of any suitable value. The detector d14 is preferably operable over a spectral range of approximately 400 to 700 nanometers, but may alternatively be operable over any suitable spectral range. Preferably, the detector d14 includes one or more PIN photodiodes, which function to receive photonic inputs P from an interrogation zone d12, and convert the impending electromagnetic radiation into an electrical signal. The PIN diodes are preferably adjusted during the manufacturing of the detection system 110 to optimize their detection within a predetermined range. For example, the PIN diodes are adjusted with a minimum detection above the optical and electrical "noise floor" of the detection system 110 and are set with a maximum detection near the "operation ceiling" of the detection system 110. The adjustment preferably incorporates the use of calibration beads, but any other suitable method may be used. Although a PIN photodiode is preferred, the detector d14 may alternatively use other suitable detection devices with a wide dynamic range, such as specialized photomultipliers or other photodiodes.

The detection system 110 of the preferred embodiment further includes an amplifier d16 that is coupled to the detector d14. The amplifier d16 preferably receives the electrical signal of the detector d14 and amplifies the signal by a predetermined amount, depending upon the strength of the output and the breadth of the detector range. Although the amplifier d16 preferably operates in the electrical domain, the amplifier d16 may alternatively operate in the optical domain. For example, the amplifier d16 may be integrated or partially integrated into the detector d14, such as in the case of an avalanche photodiode (APD), which is an amplified photodetector known in the art. The preferred amplifier d16 has a signal-to-noise ratio (SNR) ranging between approximately 100 dB and 120 dB.

The detection system 110 of the first preferred embodiment further includes a compression unit d18 that is coupled to the amplifier d16. The compression unit d18 functions to reduce the dynamic range of the plurality of electrical signals from the amplifier d16 and compress that data into an electrical signal with a smaller dynamic range that is appropriate for the ADC d20 of the preferred system. In the preferred embodiment, the detection system 110 incorporates signal compression to obtain better resolution for the input signals in the lower end of the signal range. The compression unit d18 preferably uses a nonlinear compression algorithm, such as a logarithmic compression algorithm, but may use a linear, parametric, or any other suitable approach. In alternative embodiments, the detection system 110 may omit the compression unit d18.

The ADC d20 of the detection system 110 functions to convert an analog signal into a digital signal that is readily usable by a digital circuit, processor, or computing device. The ADC d20 preferably includes a high bit resolution. As used herein, the term "high bit resolution" is preferably defined as greater than or equal to 16-bits, and more preferably defined as greater than or equal to 24-bits. The ADC d20 preferably includes a Signal-to-Noise Ratio (SNR) of approximately greater than 100 dB, but may alternatively include a SNR of any suitable value.

In a first variation, the system for a flow cytometer 100 may include more than one detectors d14 that preferably operate on the same photonic input from the interrogation zone d12, but cover substantially different (overlapping or non-overlapping) subsets of the dynamic range of the photonic input. This allows one or more detectors to divide the responsibility of the detector d14. In this variation, the detectors d14 preferably have smaller dynamic ranges (on the order of 50-60 dB), set at different portions (overlapping or non-overlapping) of the dynamic range of the photonic input. Preferably, the amplifiers 116 complement the respective detectors d114, such that a high-gain amplifier is matched with one detector, and a low-gain amplifier is matched with another detector. Alternatively, the amplifiers d116 may have identical or substantially identical gain and SNR values.

In a second variation, the system for a flow cytometer 100 may include more than one amplifiers d16 that preferably operate on the output from the detector d14, but amplify the analog signal from the detector d14 at different gain levels. This allows more than one amplifier to divide the responsibility of the amplifier d16. In this variation, the amplifiers d16 are preferably set at distinct gain levels (e.g., one is set with a higher gain level, while the other is set at a lower gain level), but the amplifiers d16 may be set at similar gain levels and then dynamically controlled according to the AGC unit or any other suitable device or method.

The detection system 110 is preferably used to collect data for a plurality of fluorescence channels. A fluorescence channel is preferably a sample of data for a spectral range of light where fluorescence from a fluorochrome is most concentrated. Optical filters are preferably used to bandpass filter a photonic input such that only fluorescence light in the spectral range is detected, but alternatively the filtering may be performed in circuitry, digitally, and/or by any suitable means. A flow cytometer will preferably be able to detect four fluorescence channels, but two to eight fluorescence channels or any suitable number may alternatively be detected.

2. Fluorochrome Compensation Factors

The fluorochrome compensation factors (FCFs) 120 of the preferred embodiment function to describe the necessary compensation for spectral spillover. When the signals of two fluorescence channels are compared for the fixed gain detection system, a given fluorochrome preferably has a predictable and unique amount of spillover into other detectors or fluorescence channels other than the primary fluorescence channel. In many cases, the spillover is linear with increasing fluorescence, and the variation is preferably predictable, specifically across the top 4 log range of a fluorescence detector or fluorescence channel. A fluorochrome compensation factor (FCF) 120 preferably links the fluorochrome type with the variables associated with the predictable spectral spillover. The FCFs 120 are preferably a pre-calculated, fluorochrome specific compensation value or values. The FCF 120 preferably mathematically describes the linear relationship between two fluorescence channels. A FCF 120 more specifically preferably describes the slope and y-intercept of this relationship or alternatively, the coefficients of any suitable equation. The FCF 120 may alternatively describe any mathematically relationship of fluorochrome type and spillover compensation for a flow cytometer with a fixed gain detection system 110. The FCFs 120 preferably remains constant for a fixed gain detection system 110. The FCF 120 of a fluorochrome is preferably calibrated for a given detection system. The FCF 120 preferably only needs to be measured or calculated once. Preferably, the FCFs 120 include a FCF 120 for a wide variety of fluorochromes such as FITC (fluorescein isothiocyanate), PE (R-Phycoerythrin), PerCP-Cy5·5, APC (allophycocyanin), and/or any suitable fluorochrome. A provider of the flow cytometer preferably provides the FCFs 120, but alternatively a user may experimentally determine a FCF 120 or add to the FCFs 120 (such as when a FCF is not provided or a new type fluorochrome is being used). The FCFs 120 are preferably stored in software and/or hardware (either locally and/or remotely) and accessible by the computer system. The FCFs 120 may be stored in any suitable database, structure, and/or storage medium.

3. Computer System

The computer system 130 of the preferred embodiment functions to gather fluorochrome information and/or perform spectral spillover compensation on gathered data. The computer system 130 preferably includes an interface that gathers fluorochrome information of a sample and a software program that compensates for spectral spillover in collected data using the fluorochrome compensation factors. The computer system 130 is preferably a personal computer (PC) in electronic communication with the flow cytometer (wired or unwired). The computer system 130 may alternatively be configured as a software and/or hardware module. In an alternative variation, the flow cytometer and the computer system 130 may be physically separated. That is, the flow cytometer might store raw collected data on a memory device (such as a CD-ROM or other such media), which can then be removed and/or transferred to the computer system (such as a PC) for analysis. This approach has the advantage of minimizing the use time by each user of the flow cytometer. The collection of the data in this manner eliminates the expenditure of valuable user time during the pre-set step and avoids the potential loss of valuable data. The computer system 130 may additionally be multiple processor, such as a data processor on the flow cytometer and a user interface on a PC. Any suitable computer system architecture or configuration may alternatively be used.

The interface 132 of the preferred embodiment functions to gather fluorochrome information about a sample. The interface 132 is preferably a graphical user interface (GUI) such as a drop down menu, text field, selectable items in a menu, or any suitable GUI for entry of fluorochrome information. A user is preferably able to enter the type of fluorochromes used in the preparation of a sample, and any additional information such as concentration. The interface 132 may additionally deduce fluorochrome information based on reagents, dyes, reagent panels (a preconfigured setup of multiple reagents), wellplate prepared experiments, and/or any information from which fluorochromes in the sample may be deduced. In an alternative embodiment, the interface 132 is an input device that cooperates with detectable devices associated with specific reagents to determine fluorochrome information. The input device 132 may be a barcode scanner, an RFID tag reader, or any suitable input device. The containers of a reagent preferably include a detectable device such as a barcode, RFID tag, computer readable marking, or any suitable device. The detectable device preferably indicates the identity of the reagent, dye, or fluorochrome. A prepared wellplate kit may alternatively include a detectable device. In this alternative, fluorochrome information is preferably gathered without a graphical computer interface. The fluorochrome information is preferably used to determine the proper FCFs 120 to use during spectral spillover compensation.

The analysis program 134 of the preferred embodiment functions to process collected data and compensate for spectral spillover using the fluorochrome compensation factors. The spectral spillover in a first fluorescence channel is preferably removed by using the FCFs of the fluorochromes in the sample. The predicted spectral spillover from a fluorochrome with a different primary fluorescence channel is preferably calculated from the FCF and additionally fluorescence intensity information. The calculations are preferably based on linear equations and matrix algebra (with n detectors and n fluorochromes), but may be based on any suitable mathematical methods. In one preferred embodiment, for a given detector n of a set of detectors 1 through N, where the detectors are trained on a specific particle that contains some mix of fluorochromes 1 through M:

$$O_n = \sum_1^M (S_m^n * I_m)$$

Where:
$O_n$ is the output of a given detector;
$S_m^n$ is the spillover ratio of fluorochrome m into detector n, preferably determined by the detector sensitivity and optical filter band for that detector, $S_m^n$ is preferably normalized such that a value of 1 would indicated a complete capture of the entire fluorochrome spectrum;
$I_m$ is the intensity of fluorochrome m for the particle in question.

This is preferably so, if $S_m^n$ are determined (e.g., by any suitable calibration methods preferably performed by a manufacturer); $O_n$ are all known from the detection system outputs; and $M \leq N$. Then a system of equations can preferably be set up to solve for all $I_m$ without requiring any compensation steps by the user. The analysis program 134 may alternatively be designed for fluorochromes that display other mathematical relationships of spectral spillover. The analysis program 134 preferably automatically performs the spectral spillover compensation for all fluorescence channels or all suitable fluorescence channels. The analysis program 134 may additionally perform any other processing tasks required by the flow cytometer or the fixed gain detection system 110, such as applying scaling factors to the collected data, independent of the acquisition step.

4. Method of Collecting Data in a Flow Cytometer

Figure 4:
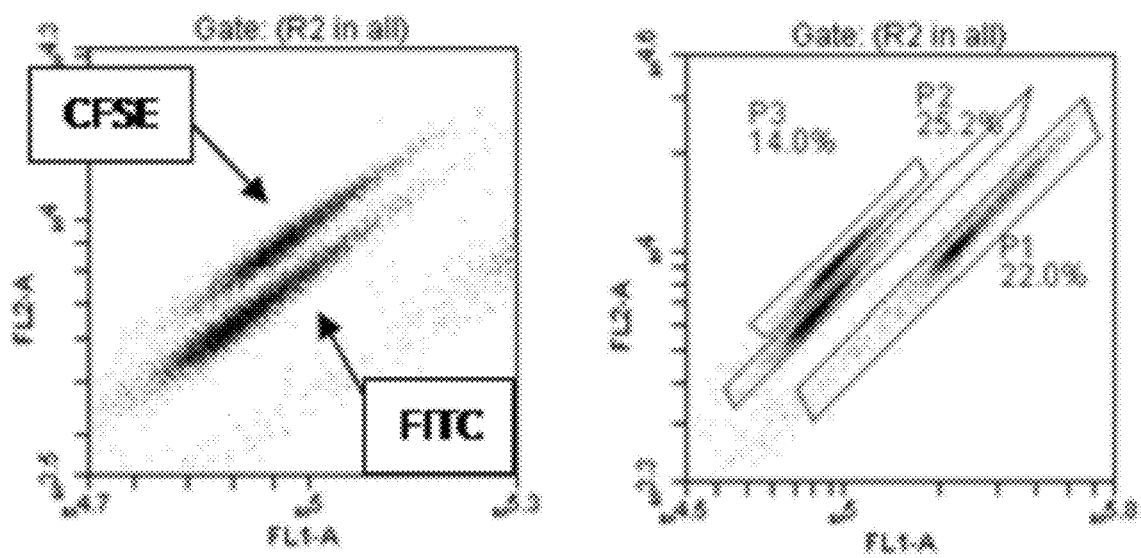
FIG. 4 is a graph exemplifying a linear relationship of spectral spillover for two fluorescence channels of a fixed gain detector system.

As shown in FIG. 4, the method of collecting data in a flow cytometer of the preferred embodiment includes the steps acquiring fluorochrome information for a sample through a computer interface S110, collecting sample data with a fixed gain detection system S120, accessing stored Fluorochrome compensation factors associated with the acquired fluorochrome information S130; and compensating for spectral spillover using the accessed fluorochrome compensation factors S140. The method functions to use the fixed gain detection system to collect data such that spectral spillover in a sample with multiple fluorochromes is reduced to a predictable relationship. The fixed gain detection system used with the method is preferably substantially similar to the fixed gain detection system described above.

Step S110, which includes acquiring fluorochrome information for a sample, is preferably accomplished through a computer interface, but may be accomplished through any suitable device or method.

Step S120, which includes collecting sample data, preferably includes the sub-steps of collecting photonic inputs from an interrogation zone of the flow cytometer for a wide spectrum of light and for a plurality of fluorescence channels S112, generating an analog signal based on the photonic inputs S114, and converting the analog signal to a digital signal S116. Step S112 and step S114, which include collecting of photonic inputs and generating an analog signal based on the photonic inputs, are preferably performed by a detector substantially similar to the detector described above. As described above, a fixed gain system preferably outputs absolute photometric units (such as an absolute photon count). An additional step may include calculating an absolute MESF using the intensity of laser excitation at the interrogation zone and the output of the detection system. Step S116, which includes generating an analog signal, is preferably performed by an analog-to-digital converter substantially similar to the analog-to-digital converter described above. The step of collecting sample data may additionally use the detection system and alternatives or variations described above or by any suitable method.

Step S130, which includes accessing stored Fluorochrome compensation factors associated with the acquired fluorochrome information, is preferably accomplished over a computer network, but may be accomplished through any suitable device or method.

Step S140, which include compensating for spectral spillover, preferably includes the substeps of computing expected spectral spillover using a fluorochrome compensation factor S142 and subtracting the expected spectral spillover from a fluorescence channel S144. The expected spectral spillover is preferably calculated as described above, by using the fluorochrome compensation factors as the coefficients of an equation. The equation is preferably a linear equation and the FCFs include the slope and y-intercept for the relationship of two fluorescence channels for a particular fluorochrome. The level of one fluorescence channel is preferably used to calculate the amount of spillover in a second fluorescence channel. This calculation is preferably repeated to compensate for spillover from a fluorescence channel into all the other fluorescence channels, but only a user selected or limited number of channels may have spillover compensation performed.

As a person skilled in the art will recognize from the previous detailed description and from the figures and claims, modifications and changes can be made to the preferred embodiments of the invention without departing from the scope of this invention defined in the following claims.

We claim:
1. A system for a flow cytometer that collects data for a sample prepared with a plurality of fluorochromes comprising:
   a fixed gain detection system that collects data for a plurality of fluorescence channels, the detector having a wide dynamic range;
   fluorochrome compensation factors for a plurality of fluorochromes types, wherein a fluorochrome compensation factor remains constant for the fixed gain detection system; and
   a computer system that includes:
      an interface that gathers fluorochrome information of the sample; and
      an analysis program that compensates for spectral spillover in the collected data, using the fluorochrome compensation factors.
2. The system of claim 1, wherein the detection system includes multiple detectors for collecting fluorescence over a wide spectrum of light, the individual detectors measuring light for a single fluorescence channel.
3. The system of claim 1, wherein the compensation factors are mathematical descriptions of a relationship of spectral spillover for the fixed gain detection system, the relationship being a substantially linear function dependent on fluorescence type.
4. The system of claim 3, wherein the compensation factors are stored within the computer system as a pre-calculated, fluorochrome-specific spectral compensation value.

5. The system of claim 4, wherein a compensation factor is associated with a calibrated slope and y-intercept of a two fluorescence channel relationship for the fixed gain detector system.

6. The system of claim 4, wherein the fluorochrome information is associated with the types of fluorochromes within the sample.

7. The system of claim 6, wherein the interface is a computer graphical interface for human entry of fluorochrome information of the sample.

8. The system of claim 6, wherein a computer detectable device is sensed by the computer interface to determine the type of fluorochrome information.

9. The system of claim 6, wherein fixed gain describes a constant voltage and gain.

10. The system of claim 9, wherein the fixed gain detection system collects data that is an absolute measurement in photometric units.

11. The system of claim of 9, wherein particles of the sample that are sized 1 micron to 100 microns are detectable in the wide dynamic range.

12. The system of claim 9, wherein the wide dynamic range is at least a six decade span.

13. The system of claim 9, wherein the fixed gain detection system is not alterable by an experimenter during a single fluorochrome calibration of a sample.

14. A system for a flow cytometer comprising:
a fixed gain detection system including:
a detector that receives photonic inputs from an interrogation zone of the flow cytometer to sense a plurality of channels of fluorescence and that produces an analog signal, the detector having a wide dynamic range; and
an analog-to-digital converter (ADC) coupled to the detector and that converts an analog signal to a digital signal, the ADC having a high bit resolution; and
an analysis program that compensates for spectral spillover for sampled data, wherein the software uses stored fluorochrome compensation factors that are static for the detection system.

15. The system of claim 14, further including an amplifier coupled to the detector.

16. The system of claim 14, wherein wide dynamic range is at least six decades.

17. The system of claim 14, wherein the analog signal of the detector is an absolute measurement of photon counts.

18. The system of claim 14, wherein the software program includes an interface for entry of the fluorochrome information of a sample.

19. The system of claim 18, wherein the analysis program calculates expected spillover in a second fluorescence channel using a stored fluorochrome compensation factor and a measurement from a first fluorescent channel, and the analysis program subtracts the expected spillover from a measurement of the second fluorescence channel.

20. The system of claim 19, wherein the detection system includes a plurality of detectors and a plurality of analog-to-digital converters, where a detector is coupled to an ADC and measures a single fluorescence channel.

21. The system of claim 19, wherein the detection system includes a plurality of analog-to-digital converters coupled to a detector, wherein an individual ADC handles a single fluorescence channel.

22. A method of collecting data in a flow cytometer system comprising:
acquiring fluorochrome information for a sample through a computer interface;
collecting sample data with a fixed gain detection system of the flow cytometer;
accessing stored fluorochrome compensation factors associated with the acquired fluorochrome information; and
compensating for spectral spillover using the accessed fluorochrome compensation factors.

23. The method of claim 22, wherein the step of compensating for spectral spillover includes:
computing expected spectral spillover using a fluorochrome compensation factor; and
subtracting the expected spectral spillover from a fluorescence channel.

24. The method of claim 23, wherein the compensation is accomplished without requiring a single fluorochrome sample to be examined for calibration of the fixed gain detection system.

25. The method of claim 23, including calculating molecules of equivalent soluble fluorophore (MESF) from a calibrated intensity measurement of an excitation laser of the flow cytometer and from the sample data collected by the fixed gain detection system.

* * * * *